United States Patent
Yamauchi

[11] Patent Number: 6,064,275
[45] Date of Patent: May 16, 2000

[54] INTERNAL VOLTAGE GENERATION CIRCUIT HAVING RING OSCILLATOR WHOSE FREQUENCY CHANGES INVERSELY WITH POWER SUPPLY VOLTAGE

[75] Inventor: Tadaaki Yamauchi, Hyogo, Japan

[73] Assignee: Mitsubishi Denki Kabushiki Kaisha, Tokyo, Japan

[21] Appl. No.: 09/318,240

[22] Filed: May 25, 1999

Related U.S. Application Data

[62] Division of application No. 08/780,909, Jan. 9, 1997, Pat. No. 5,982,162.

[30] Foreign Application Priority Data

Apr. 22, 1996 [JP] Japan ..................................... 8-100055

[51] Int. Cl.[7] .................................. H03L 7/00; G05F 3/16
[52] U.S. Cl. ......................... 331/57; 327/534; 331/177 R
[58] Field of Search .................................. 331/57, 177 R; 327/534, 535, 536, 537

[56] References Cited

U.S. PATENT DOCUMENTS

| | | | |
|---|---|---|---|
| 5,097,198 | 3/1992 | Holmdahl | 323/280 |
| 5,391,979 | 2/1995 | Kajimoto et al. | 323/313 |
| 5,394,372 | 2/1995 | Tanaka et al. | 365/226 |
| 5,557,193 | 9/1996 | Kajimoto | 323/282 |
| 5,689,460 | 11/1997 | Ooishi | 327/530 |

FOREIGN PATENT DOCUMENTS 7-129265  5/1995  Japan .

OTHER PUBLICATIONS

Horiguchi, Masashi et al., "A Tunable CMOS–DRAM Voltage Limiter with Stabilized Feedback Amplifier", *IEEE Journal of Solid–State Circuits*, vol. 25, No. 5, Oct. 1990, pp. 1129–1134.

*Primary Examiner*—Siegfried H. Grimm
*Attorney, Agent, or Firm*—McDermott, Will & Emery

[57] ABSTRACT

An internal voltage generation circuit down converts an external power supply voltage on the basis of a reference voltage. An oscillator outputs a pulse voltage according to a power supply voltage. A pump circuit generates the internal voltage according to the pulse voltage. A control circuit for the oscillator may include a current mirror amplifier so that when the power supply voltage is reduced the frequency of the pulse voltage becomes higher a corresponding amount and when the power supply voltage is increased the frequency of the pulse voltage becomes lower a corresponding amount.

6 Claims, 7 Drawing Sheets

INTERNAL VOLTAGE GENERATION CIRCUIT HAVING RING OSCILLATOR WHOSE FREQUENCY CHANGES INVERSELY WITH POWER SUPPLY VOLTAGE

This application is a divisional of application Ser. No. 08/780,909 filed Jan. 9, 1997 and now U.S. Pat. No. 5,982,162.

BACKGROUND OF THE INVENTION

1. Field of the Invention

The present invention relates to internal power supply voltage generation circuits, internal voltage generation circuits, and semiconductor devices, and more particularly, to an internal power supply voltage generation circuit immune to variation in external power supply voltage and temperature, an internal voltage generation circuit immune to variation in power supply voltage, and a semiconductor device immune to variation in internal power supply voltage.

2. Description of the Background Art

FIG. 13 is a circuit diagram showing in detail an internal voltage-down power supply circuit as a conventional internal power supply voltage generation circuit.

Referring to FIG. 13, an internal voltage-down power supply circuit 94 generates and supplies to a control circuit group 63 an internal power supply voltage intVcc. Control circuit group 63 includes a plurality of control circuits which operate according to internal power supply voltage intVcc. Internal voltage-down power supply circuit 94 includes a comparator circuit 67 and a voltage-down circuit 1. Voltage-down circuit 1 is formed of a PMOS transistor. Comparator circuit 67 is formed of a current mirror type amplify circuit. Comparator circuit 67 includes PMOS transistors 7 and 9, NMOS transistors 11 and 13, and a constant current source 69.

An output voltage from comparator circuit 67 is applied to the gate of PMOS transistor 1. PMOS transistor 1 down-converts an external power supply voltage extVcc according to the level of the output voltage to generate internal power supply voltage intVcc. A reference voltage Vref is applied to the gate of NMOS transistor 13 of comparator circuit 67. Internal power supply voltage intVcc generated from PMOS transistor 1 is applied to the gate of NMOS transistor 11 of comparator circuit 67. Therefore, comparator circuit 67 provides a voltage to the gate of MOS transistor 1 so that the level of internal power supply voltage intVcc is equal to the level of reference voltage Vref.

FIG. 14 is a schematic block diagram of a conventional semiconductor device. Components corresponding to those of FIG. 13 have the same reference characters allotted, and their description will not be repeated.

Referring to FIG. 14, a conventional semiconductor device includes four memory arrays 97, and external power supply pad 95, an internal voltage-down power supply circuit 94, a power line 71, and a control circuit group 63. Memory array 97 includes a plurality of memory cells to store data. Internal voltage-down power supply circuit 94 is located in the proximity of external power supply pad 95 provided at the end of the chip. External power supply pad 95 serves to supply external power supply voltage extVcc to internal voltage-down power supply circuit 94. Power line 71 serves to supply internal power supply voltage intVcc generated from internal voltage-down power supply circuit 94 to control circuit group 63.

As described above, a conventional internal voltage-down power supply circuit forms a closed loop in which the output which is internal power supply voltage intVcc is applied to comparator circuit 67. When external power supply voltage extVcc is shifted to a greater value, or when the temperature during the operation of internal voltage-down power supply circuit 94 is low, the channel conductance of the transistors forming internal voltage-down power supply circuit 94 becomes greater to increase the voltage gain of comparator circuit 67 and voltage-down power supply circuit 1. This induces the problem that internal power supply voltage intVcc is easily oscillated unnecessarily which is the output of internal voltage-down power supply circuit 94.

As described above, a conventional semiconductor device has internal voltage-down power supply circuit 94 provided at the end of the chip. If control circuit group 63 that operates according to internal power supply voltage intVcc is arranged remote from internal voltage-down power supply circuit 94, the resistance of power line 71 is increased. This causes the level of internal power supply voltage intVcc in the proximity of control circuit group 63 to become lower than the level of internal power supply voltage intVcc in the proximity of internal voltage-down power supply circuit 94 by the parasitic resistance of power line 71 when the power consumption of control circuit group 63 is increased. It is to be noted that internal voltage-down power supply circuit 94 generates internal power supply voltage intVcc by feeding back internal power supply voltage intVcc in the proximity of internal voltage-down power supply circuit 94. There was a problem that internal voltage-down power supply circuit 94 does not easily follow the variation of internal power supply voltage intVcc in the proximity of control circuit group 93.

SUMMARY OF THE INVENTION

In view of the foregoing, an object of the present invention is to provide an internal power supply voltage generation circuit that does not have an internal power supply voltage intVcc unnecessarily oscillated in response to variation in an external power supply voltage extVcc and temperature.

Another object of the present invention is to provide a semiconductor device including an internal power supply voltage generation circuit that can generate internal power supply voltage intVcc in response to variation in internal power supply voltage intVcc in the proximity of a control circuit group even when the internal power supply voltage generation circuit and the control circuit group are remote from each other. More specifically, the another object of the present invention is to provide a semiconductor device including an internal power supply voltage generation circuit that has superior followability to variation of internal power supply voltage intVcc in the proximity of a control circuit group.

A further object of the present invention is to provide an internal voltage generation circuits that has increase of the time for internal voltage to attain a predetermined voltage level suppressed even when power supply voltage is reduced.

According to a first aspect of the present invention, an internal power supply voltage generation circuit generates an internal power supply voltage. The internal power supply voltage generation circuit includes a current mirror amplify circuit, a voltage-down circuit, and a current source control circuit. The current mirror amplify circuit includes a current source. The current mirror amplify circuit is a comparator circuit for comparing a reference voltage with an internal power supply voltage. The voltage-down circuit down-converts an external power supply voltage for generating an internal power supply voltage according to the comparison result of the current mirror amplify circuit. The current source control circuit controls the current source so that the current from the current source is reduced according to increase, if any, of the external power supply voltage, and increased according to decrease, if any, of the external power supply voltage.

In the internal power supply voltage generation circuit of the first aspect, control is provided so that, when the external power supply voltage becomes higher, the current from the current source of the current mirror amplify circuit is decreased according to increase of the external power supply voltage. Therefore, increase of the closed loop gain of the internal power supply voltage generation circuit can be suppressed even when the external power supply voltage is altered to a higher value. Therefore, unnecessary oscillation of the internal power supply voltage can be prevented.

According to a second aspect of the present invention, an internal power supply voltage generation circuit generates an internal power supply voltage. The internal power supply voltage generation circuit includes a current mirror amplify circuit, a voltage-down circuit, and a current source control circuit. The current mirror amplify circuit includes a current source. The current mirror amplify circuit includes a comparator circuit for comparing a reference voltage with an internal voltage. The voltage-down circuit down-converts an external power supply voltage to generate an internal power supply voltage according to the comparison result of the current mirror amplify circuit. The current source control means controls the current source so that the current from the current source is increased according to increase, if any, of the temperature, and reduced according to decrease, if any, of the temperature.

In the internal power supply voltage generation circuit of the second aspect of the present invention, control is provided so that, when the temperature becomes lower, the current from the current source of the current mirror amplify circuit is reduced according to reduction in the temperature. Therefore, increase of the closed loop gain of the internal power supply voltage generation circuit can be suppressed even when the temperature during operation is low. Thus, unrequired oscillation of the internal power supply voltage can be prevented.

According to a third aspect of the present invention, an internal power voltage generation circuit includes an oscillation circuit, a pump circuit, and an oscillation control circuit. The oscillation circuit oscillates a pulse voltage on the basis of a power supply voltage. The pump circuit generates an internal voltage according to the pulse voltage. The oscillation control circuit controls the oscillation circuit so that the frequency of the pulse voltage becomes higher according to reduction, if any, of the power supply voltage. The oscillation control circuit controls the oscillation circuit so that the frequency of the pulse voltage becomes lower according to increase, if any, of the power supply voltage.

In the internal voltage generation circuit of the third aspect, control is provided so that the frequency of the pulse voltage for driving the pump circuit becomes higher according to decrease, if any, of the power supply voltage. Therefore, sufficient level of pumping can be obtained even when the power supply voltage is lowered. Increase in the time required for the internal voltage to attain a predetermined voltage level can be suppressed.

According to a fourth aspect of the present invention, a semiconductor device includes an internal circuit, an internal power supply voltage generation circuit, a power line, and a conductor line. The internal power supply voltage generation circuit generates an internal power supply voltage. The power line supplies on internal power supply voltage to the internal circuit. The conductor line is connected to the power line in the proximity of the internal circuit, and is not connected to the power line except at the proximity of the internal circuit. The internal power supply voltage generation circuit compares a reference voltage with an internal power supply voltage in the proximity of the internal circuit to generate an internal power supply voltage according to the comparison result. The internal power supply voltage in the proximity of the internal circuit is transmitted to the internal power supply voltage generation circuit by the conductor line.

According to a fifth aspect of the present invention, a semiconductor device includes an internal circuit, and an internal power supply voltage generation circuit. The internal power supply voltage generation circuit generates an internal power supply voltage that is supplied to the internal circuit. The internal power supply voltage generation circuit generates an internal power supply voltage according to the comparison results of a reference voltage and an internal power supply voltage. The internal power supply voltage generation circuit includes a reference voltage generation circuit. The reference voltage generation circuit alters the reference voltage according to the internal power supply voltage in the proximity of the internal circuit.

According to the semiconductor devices of the fourth and fifth aspects of the present invention, an internal power supply voltage can be generated accommodating change in the internal power supply voltage in the proximity of the internal circuit. Therefore, followability can be improved with respect to the variation in the internal power supply voltage at the proximity of the internal circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An internal power supply voltage generation circuit, an internal voltage generation circuit, and a semiconductor device according to the present invention will be described hereinafter with reference to the drawings.

First Embodiment

Figure 1:
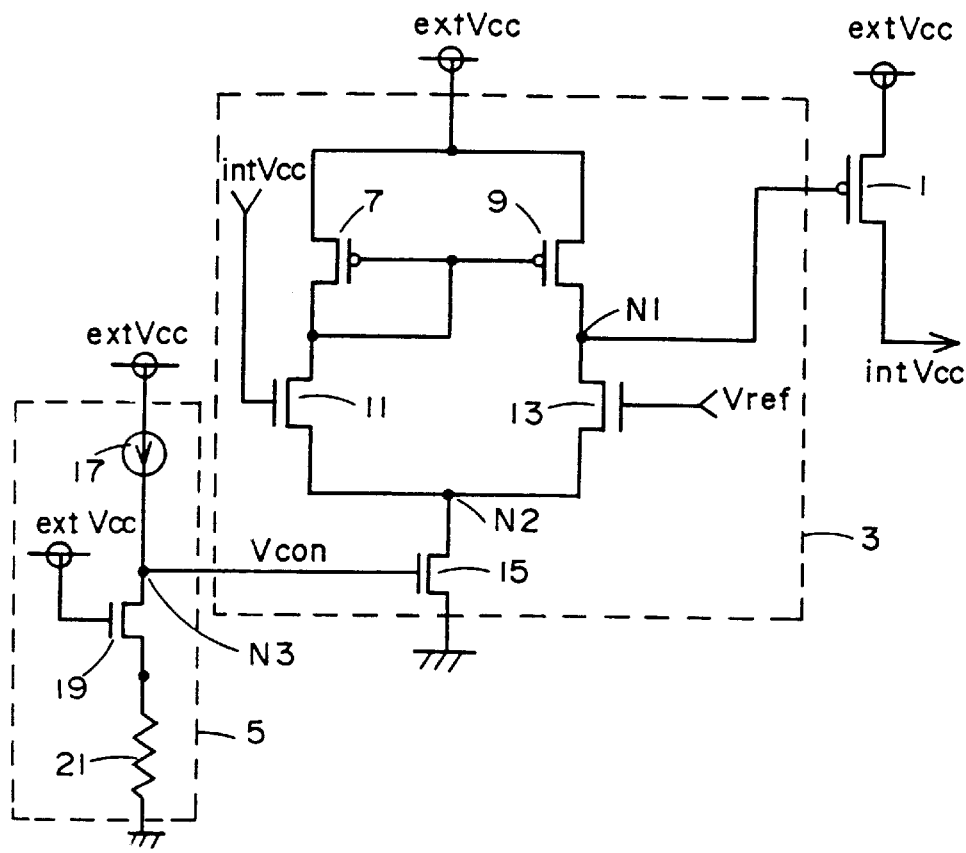
FIG. 1 is a circuit diagram showing in detail an internal voltage-down power supply circuit as an internal power supply voltage generation circuit according to a first embodiment of the present invention.

Referring to FIG. 1, an internal voltage-down power supply circuit as an internal power supply voltage generation circuit of the first embodiment includes a voltage-down circuit 1, a comparator circuit 3, and a current source control circuit 5. Comparator circuit 3 includes PMOS transistors 7 and 9, NMOS transistors 11 and 13, and a current source 15. Current source control circuit 5 includes a constant current source 17, an NMOS transistor 19, and a resistance element 21.

Voltage-down circuit 1 is formed of an PMOS transistor. Comparator circuit 3 is formed of a current mirror type amplify circuit. An output node N1 of comparator circuit 3 is connected to the gate of PMOS transistor 1.

The connection of the elements forming comparator circuit 3 will be described hereinafter. PMOS transistor 7 and NMOS transistor 11 are connected in series between a node having external power supply voltage extVcc and a node N2. The gate of NMOS transistor 11 receives internal power supply voltage intVcc generated by PMOS transistor 1. PMOS transistor 9 and NMOS transistor 13 are connected in series between a node having external power supply voltage extVcc and node N2. The gate of NMOS transistor 13 receives a reference voltage Vref. PMOS transistors 7 and 9 have their gates connected to the drain of NMOS transistor 11. Current source 15 is connected between node N2 and a node having ground voltage. Current source 15 is formed of an NMOS transistor. NMOS transistor 15 has its gate connected to an output node N3 of current source control circuit 5.

The elements forming current source control circuit 5 will be described hereinafter. A constant current source 17 is connected between the node having external power supply voltage extVcc and output node N3. NMOS transistor 19 and resistance element 21 are connected in series between node N3 and the node having ground voltage. External power supply voltage extVcc is applied to the gate of NMOS transistor 19.

The operation will be described hereinafter. PMOS transistor 1 responds to a voltage provided from output node N1 of comparator circuit 3 to down-convert external power supply voltage extVcc for generating an internal power supply voltage intVcc. When internal power supply voltage intVcc is smaller than reference voltage Vref, comparator circuit 3 provides a voltage of an L level (logical low) from output node N1 to the gate of PMOS transistor 1. In response, the channel conductance of PMOS transistor 1 becomes greater. This causes the level of internal power supply voltage intVcc to be increased. When internal power supply voltage intVcc becomes as high as the level of reference voltage Vref, comparator circuit 3 provides a voltage of an H level (logical high) from output node N1 to the gate of PMOS transistor 1. In response, PMOS transistor 1 is turned off. As a result, internal power supply voltage intVcc will become stable at the level equal to reference voltage Vref.

It is assumed that the current generated by constant current source 17 is Im, the channel resistance of NMOS transistor 19 is Rg, and the resistance of resistance element 21 is R. In this case, the voltage of node N3 is Im (R+Rg). When the gate-source voltage (Vgs=extVcc−Im R) of NMOS transistor 19 is increased, Rg becomes smaller. Therefore, the voltage of node N3 is reduced in proportion to increase of external power supply voltage extVcc. More specifically, when external power supply voltage extVcc rises, current source control circuit 5 provides a control voltage Vcon that is reduced according to the increase from output node N3 to the gate of NMOS transistor 15. Therefore, the current flowing towards NMOS transistor 15 is reduced. This causes the voltage gain of comparator circuit (current mirror type amplify circuit 3) to become smaller. In the case of decrease in external power supply voltage extVcc, current source control circuit 5 provides a control voltage Vcon that is increased according to the decrease to the gate of NMOS transistor 15 from output node N3. In response, the current flowing to NMOS transistor 15 is increased, so that the voltage gain of comparator circuit (current mirror type amplify circuit) 3 is also increased. Thus, the voltage gain of comparator circuit (current mirror type amplify circuit) 3 becomes smaller as external power supply voltage extVcc becomes greater. When external power supply voltage extVcc becomes smaller and the gain voltage of comparator circuit (current mirror type amplify circuit) 3 increases, it is said that the voltage gain of comparator circuit (current mirror type amplify circuit) 3 has a negative dependence on external power supply voltage extVcc. As described above, NMOS transistor 19 is used as a resistance element.

Figure 2:
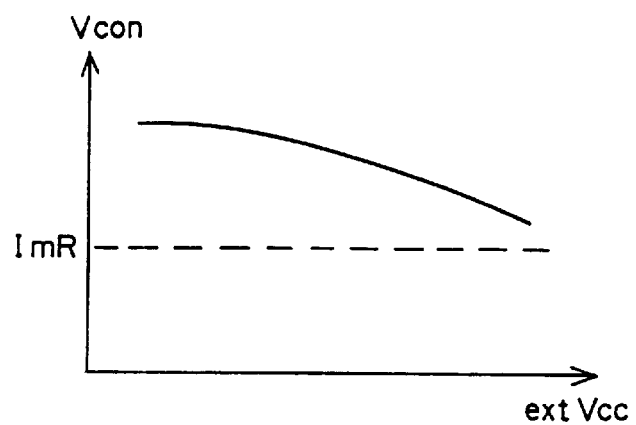
FIG. 2 is a diagram for describing an operation of the internal voltage-down power supply circuit of FIG. 1.

FIG. 2 is a graph showing the relationship between external power supply voltage extVcc and control voltage Vcon. Control voltage Vcon is plotted along the ordinate, and external power supply voltage extVcc is plotted along the abscissa. It is appreciated from FIG. 2 that control voltage Vcon is reduced as external power supply voltage extVcc increases.

Thus, in the internal voltage-down power supply circuit of the first embodiment, the voltage gain of comparator circuit (current mirror type amplify circuit) 3 has a negative dependence on external power supply voltage extVcc. Therefore, increase in the closed loop gain of the internal voltage-down power supply circuit can be suppressed even when external power supply voltage extVcc is shifted to a higher level. Thus, unnecessary oscillation of internal power supply voltage intVcc can be prevented when external power supply voltage extVcc is shifted to a higher level.

In FIG. 1, resistance element 21 can be formed of a MOS transistor. In this case, resistance R of the MOS transistor becomes larger as the temperature increases. In contrast, when the temperature becomes lower, resistance R becomes smaller. Therefore, by implementing resistance element 21 with a MOS transistor, the voltage of node N3 is reduced when the temperature becomes lower. More specifically, current source control circuit 5 provides from output node N3 a control voltage Vcon that becomes lower in response to a drop in temperature to the gate of NMOS transistor 15. As a result, the current flowing to NMOS transistor 15 becomes smaller, and the voltage gain of comparator circuit (current mirror type amplify circuit) 3 is reduced. In contrast, when the temperature is increased, the voltage of node N3 becomes higher. More specifically, current source control circuit 5 provides from output node N3 a control voltage Vcon that becomes higher in response to a rise in temperature to the gate of NMOS transistor 15. As a result, the current flowing to NMOS transistor 15 is increased, and the voltage gain of comparator circuit (current mirror type amplify circuit) 3 is also increased. When the voltage gain of comparator circuit (current mirror type amplify circuit) 3 becomes lower in response to reduction in temperature and becomes greater in response to increase in temperature, it is said that the voltage gain of comparator circuit (current mirror type amplify circuit) 3 has a positive dependence on the temperature.

According to a modification of the internal voltage-down power supply circuit of the first embodiment, the voltage gain of comparator circuit (current mirror type amplify circuit) 3 has a negative dependence and a positive dependence on external power supply voltage extVcc and temperature, respectively. Therefore, increase of the closed loop gain of the internal voltage-down power supply circuit can be suppressed even when external power supply voltage extVcc is altered to a higher level and the temperature during operation of the internal voltage-down circuit is low. Thus, unnecessary oscillation of internal power supply voltage intVcc can be prevented in the case where external power supply voltage extVcc is altered to a high level and the temperature during operation of the internal voltage-down power supply circuit is low.

Second Embodiment

The voltage-down circuit and comparator circuit (current mirror type amplify circuit) of an internal voltage-down power supply circuit as an internal power supply voltage generation circuit of a second embodiment of the present invention are similar to voltage-down circuit 1 and comparator circuit (current mirror type amplify circuit) 3 of the first embodiment shown in FIG. 1. The internal voltage-down power supply circuit of the second embodiment differs from the internal voltage-down power supply circuit of the first embodiment in a current source control circuit.

Figure 3:
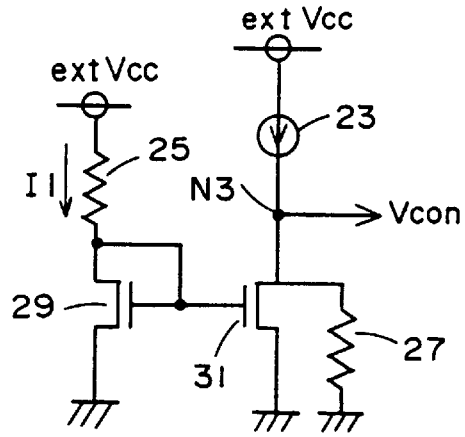
FIG. 3 is a circuit diagram showing in detail a current source control circuit used in an internal voltage-down power supply circuits as an internal power supply voltage generation circuit according to a second embodiment of the present invention.

FIG. 3 is a circuit diagram showing the detail of a current source control circuit of an internal voltage-down power supply circuit of the second embodiment.

Referring to FIG. 3, the current source control circuit includes resistance elements 25 and 27, NMOS transistors 29 and 31, and a constant current source 23. Resistance element 25 and NMOS transistor 29 are connected in series between the node having external power supply voltage extVcc and the node having ground voltage. Constant current source 23 is connected between the node having external power supply voltage extVcc and output node N3. NMOS transistor 31 and resistance element 27 are connected in parallel between output node N3 and the node having ground voltage. NMOS transistors 29 and 31 have their gates connected to resistance element 25. The current source control circuit of the above-described structure provided control voltage Vcon from output node N3 to the gate of NMOS transistor 15 of comparator circuit 3, as shown in FIG. 1. Control voltage Vcon is the voltage of output node N3.

It is assumed that the resistance values of resistance elements 25 and 27 are R1 and R2, respectively, the threshold voltage of NMOS transistor 29 is Vthn, the constant current generated from constant current source 23 is Iconst, and the current flowing to NMOS transistor 29 is I1. NMOS transistor 29 and NMOS transistor 31 form a current mirror circuit. Here, the ratio of the size of NMOS transistor 31 to NMOS transistor 29, i.e., the size of NMOS transistor 31/the size of NMOS transistor 29 is referred to as "k". This "k" is the so-called mirror ratio.

The current flowing through NMOS transistor 31 is k times current I1. The current flowing through resistance element 27 is Vcon/R2. Here, the sum of current (Vcon/R2 flowing through resistance element 27 and the current (k I1) flowing through NMOS transistor 31 is equal to current value Iconst of the constant current from constant current source 23. Current I1 flowing through NMOS transistor 29 is expressed as I1=(extVcc−Vthn)/R1. Therefore, control voltage Vcon is expressed by the following equation.

$$Vcon=-(k\ R2/R1)\ extVcc+(k\ R2\ Vthn/R1+R2\ Iconst)$$

It is appreciated from the above equation that increase in external power supply voltage intVcc causes a drop in control voltage Vcon, and decrease in external power supply voltage extVcc causes increase of control voltage Vcon. More specifically, when external power supply voltage extVcc increases, the current flowing to NMOS transistor 15 of comparator circuit 3 shown in FIG. 1 becomes smaller, so that the voltage gain of comparator circuit (current mirror type amplify circuit) 3 becomes lower. In contrast, when external power supply voltage extVcc becomes lower, the current flowing to NMOS transistor 15 of comparator circuit 3 becomes greater, so that the voltage gain of comparator circuit (current mirror type amplify circuit) 3 is increased.

According to the internal voltage-down power supply circuit of the second embodiment, the voltage gain of comparator circuit (current mirror type amplify circuit) 3 as shown in FIG. 1 has negative dependence on external power supply voltage extVcc. Therefore, increase of the closed loop gain of the internal voltage-down power supply circuit can be suppressed when external power supply voltage extVcc is altered to a high level. As a result, unnecessary oscillation of internal power supply voltage Iconst can be prevented when external power supply voltage extVcc is shifted to a high level.

Figure 4:
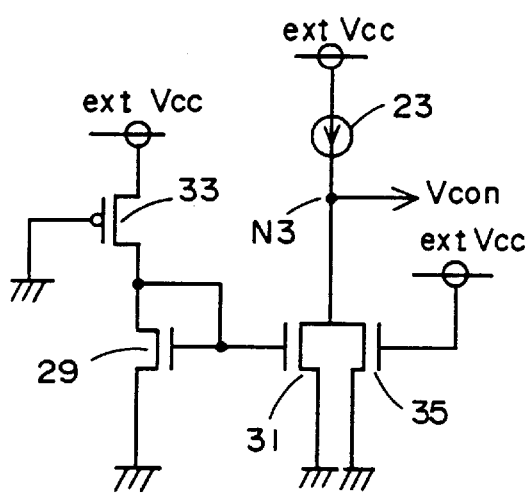
FIG. 4 is a circuit diagram showing another example of a current source control circuit used in an internal voltage-down power supply circuit as an internal power supply voltage generation circuit according to the second embodiment of the present invention.

FIG. 4 is a circuit diagram showing in detail another example of a current source control circuit of the internal voltage-down power supply circuit according to the second embodiment. Components corresponding to those of FIG. 3 have the same reference characters allotted, and their description will not be repeated.

Referring to FIG. 4, the current source control circuit has a PMOS transistor 33 instead of resistance element 25 of FIG. 3, and an NMOS transistor 35 instead of resistance element 27 of FIG. 3. More specifically, PMOS transistor 33 and NMOS transistor 29 are connected in series between the node having external power supply voltage extVcc and the node having the ground voltage. The ground voltage is applied to the gate of PMOS transistor 33. NMOS transistor 31 and NMOS transistor 35 are connected in parallel between node N3 and the node having the ground voltage. External power supply voltage extVcc is applied to the gate of NMOS transistor 35.

The current source control circuit of FIG. 3 differs from the current source control circuit of FIG. 4 in the elements used as the resistance. Therefore, the internal voltage-down power supply circuit employing the current source control circuit of FIG. 4 provides advantages similar to those of the internal voltage-down power supply circuit employing the current source control circuit of FIG. 3.

Third Embodiment

First, a substrate voltage generation circuit and a boosted voltage generation circuit as a conventional internal voltage generation circuit will be described. Here, a substrate voltage generation circuit includes a negative value, and serves to generate a substrate voltage to be supplied to the semiconductor substrate. The boosted voltage generation circuit serves to generate a boosted voltage having a value greater than power supply voltage Vcc. The conventional substrate voltage generation circuit includes a ring oscillator circuit and a pump circuit. The pump circuit operates according to clock signal CLK oscillated by the ring oscillator circuit to generate a substrate voltage Vbb. The same can be said for the boosted voltage generation circuit.

When power supply voltage Vcc that drives the pump circuit is lowered, the pump efficiency is reduced. The pump efficiency is expressed as (the current flowing to the output terminal of the pump circuit)/(current consumed by the pump circuit). Also, reduction in power supply voltage Vcc driving the pump circuit causes reduction in the pump amount per one period of the clock signal CLK. The pump amount implies the current flowing through the output terminal of the pump circuit. Thus, there is a problem that, when power supply voltage Vcc is altered to a low level, the time for substrate voltage Vbb generated from the pump circuit or boosted voltage Vpp to arrive at a predetermined voltage level becomes longer than the case where the power supply voltage Vcc attains a high level. The boosted voltage generation circuit and the substrate voltage generation circuit as the internal voltage generation circuit of the third embodiment are directed to solve this problem. Accordingly, the internal voltage generation circuit (substrate voltage generation circuit, boosted voltage generation circuit) according to the third embodiment of the present invention includes a circuit identical to current source control circuit 5 of FIG. 1, a circuit identical to the current source control circuit of FIG. 3, or a circuit identical to the current source control circuit of FIG. 4. The details will be described hereinafter.

Figure 5:
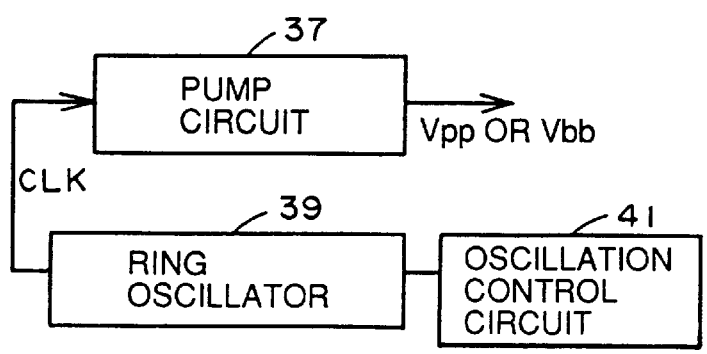
FIG. 5 is a schematic block diagram showing an internal voltage generation circuit according to a third embodiment of the present invention.

FIG. 5 is a schematic block diagram of the internal voltage generation circuit of the third embodiment. The internal voltage generation circuit of FIG. 5 can be considered as a substrate voltage generation circuit generating substrate voltage Vbb, and also as a boosted voltage generation circuit that generates boosted voltage Vpp.

Referring to FIG. 5, an internal voltage generation circuit according to the third embodiment of the present invention includes a pump circuit 37, a ring oscillator 39, and an oscillation control circuit 41. Description will be provided assuming that the internal voltage generation circuit of FIG. 5 is a substrate voltage generation circuit. Pump circuit 37 generates substrate voltage Vbb according to a clock signal (pulse voltage) CLK oscillated from ring oscillator 39. Oscillation control circuit 41 controls the frequency of clock signal (pulse voltage) CLK oscillated from ring oscillator 39. Current source control circuit 5 of FIG. 1, current source control circuit of FIG. 3, or the current source control circuit of FIG. 4 can be used as oscillation control circuit 41.

Although external power supply voltage extVcc is used as the power supply voltage in the current source control circuits of FIGS. 1, 3 and 4, the power supply voltage of oscillation control circuit 41 of FIG. 5 may be external power supply voltage extVcc, or internal power supply voltage intVcc.

Oscillation control circuit 41 responds to a drop in power supply voltage Vcc to control ring oscillator 39 so that the frequency of clock signal (pulse voltage) CLK becomes higher according to the drop of power supply voltage Vcc. A higher frequency of clock signal CLK from ring oscillator 39 causes increase of the number of operations of pump circuit 37 per unit time. Therefore, the time required for substrate voltage Vbb to arrive at a predetermined voltage level in the case of a drop in power supply voltage Vcc can be prevented from increasing. The details thereof will be described hereinafter.

Figure 6:
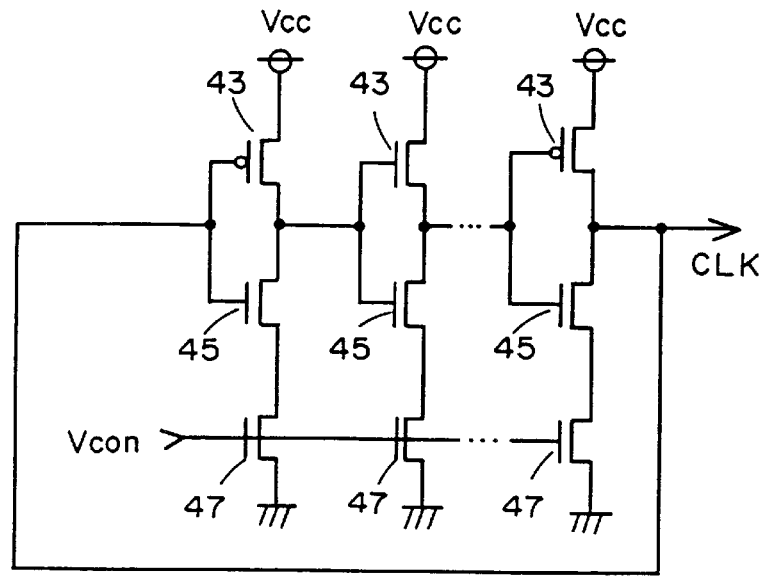
FIGS. 6 and 7 are circuit diagrams showing examples of a ring oscillator of FIG. 5.

FIG. 6 shows the detail of ring oscillator 39 of FIG. 5.

Referring to FIG. 6, ring oscillator 39 is formed having an odd number of inverters connected in series. Each inverter includes a PMOS transistor 43 and an NMOS transistor 45. The output node of the inverter of the last stage (the output node of the ring oscillator) is connected to the input node of the inverter of the first stage. Furthermore, an NMOS transistor 47 is provided corresponding to each inverter.

NMOS transistor 47 is connected between the inverter formed of PMOS transistor 43 and NMOS transistor 45 and the node having the ground voltage. The gate of NMOS transistor 47 is connected to output node N3 (FIG. 1, FIG. 3, or FIG. 4) of oscillation control circuit 41. More specifically, control voltage Vcon from oscillation control circuit 41 is applied to the gate of NMOS transistor 47. The odd number of NMOS transistors 47 provided corresponding to the odd number of inverters form a current control circuit. When power supply voltage Vcc becomes lower, oscillation control circuit 41 provides control voltage Vcon that is increased according to the drop to NMOS transistor 47. Therefore, a drop in power supply voltage Vcc causes increase in the voltage flowing to NMOS transistor 47. As a result, the delay time of the output of the inverter formed of PMOS transistor 43 and NMOS transistor 45 is reduced, and the frequency of clock signal CLK becomes higher. When power supply voltage Vcc is increased, oscillation control circuit 41 provides control voltage Vcon that is reduced according to the increase to the gate of NMOS transistor 47. Therefore, increase of power supply voltage Vcc causes the current flowing to NMOS transistor 47 to be reduced. As a result, the delay time of the inverter output is increased, and the frequency of clock signal CLK becomes lower. Thus, when power supply voltage Vcc is reduced and increased to result in a higher and lower, respectively, frequency of clock signal CLK, it is said that the oscillation frequency of ring oscillator 39 has a negative dependence on power supply voltage Vcc.

The same applies to the case where the internal voltage generation circuit of FIG. 5 is a boosted voltage generation circuit.

In the internal voltage generation circuit (substrate voltage generation circuit, boosted voltage generation circuit) of the third embodiment, the oscillation frequency of ring oscillator 39 has a negative dependence on power supply voltage Vcc. Therefore, the frequency of clock signal CLK oscillated from ring oscillator 39 becomes higher even when the power supply voltage Vcc is shifted to a low level and the pump amount per one operation of pump circuit 37 is reduced. Therefore, a sufficient pump amount can be achieved. In the internal voltage generation circuit (substrate voltage generation circuit, boosted voltage generation circuit) of the third embodiment, the time required for the internal voltage (substrate voltage Vbb, boosted voltage Vpp) to attain a predetermined voltage level can be suppressed from increasing even when the power supply voltage Vcc is altered to a low level.

Figure 7:
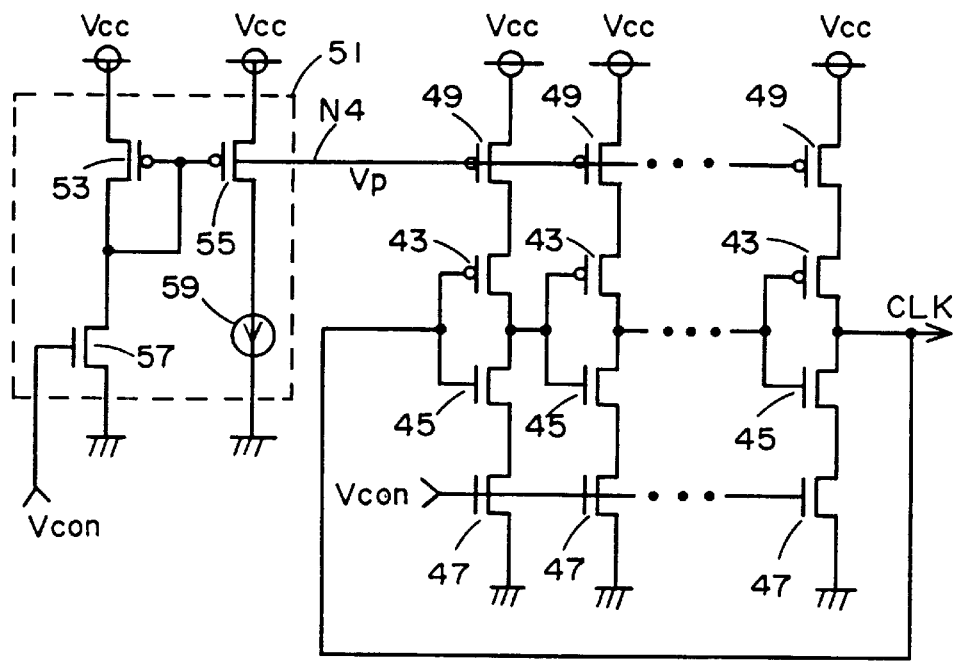

FIG. 7 is a circuit diagram showing another example of ring oscillator 39 (FIG. 5) of the internal voltage generation circuit (substrate voltage generation circuit, boosted voltage generation circuit) according to the third embodiment. Corresponding components have the same reference characters allotted, and their description will not be repeated.

Referring to FIG. 7, a ring oscillation includes a PMOS transistor 49 between PMOS transistor 43 and the node having power supply voltage Vcc, and a PMOS control circuit 51. PMOS control circuit 51 forms a current control circuit with the odd number of PMOS transistors 49 and the odd number of NMOS transistors 47. PMOS control circuit 51 includes PMOS transistors 53 and 55, an NMOS transistor 57, and a constant current source 59. PMOS transistor 53 and NMOS transistor 57 are connected in series between the node having power supply voltage Vcc and the node having ground voltage. Control voltage Vcon from oscillation control circuit 41 is applied to the gate of NMOS transistor 57. PMOS transistor 55 and constant current source 59 are connected in series between the node having power supply voltage Vcc and the node having the ground voltage. PMOS transistors 53 and 55 have their gates connected to the drain of NMOS transistor 57. Output node N4 of PMOS control circuit 51 is connected to the gate of PMOS transistor 49.

Control voltage Vcon applied to the gate of NMOS transistor 57 of PMOS control circuit 51 is a voltage that is increased according to a drop, if any, of power supply voltage Vcc. Therefore, a drop in power supply voltage Vcc causes increase of control voltage Vcon, so that voltage Vp provided from output node N4 of PMOS control circuit 51 is decreased. Therefore, the current flowing to PMOS transistor 49 is increased, and the delay time of the inverter output is reduced. Thus, the frequency of clock signal CLK from the ring oscillator becomes higher when power supply voltage Vcc is reduced.

The ring oscillator of FIG. 6 has negative dependence on power supply voltage Vcc also in the ring oscillator (FIG. 7) including an odd number of PMOS transistors 49 and PMOS control circuit 51. Therefore, an advantage similar to the case where the ring oscillator of FIG. 6 is used as ring oscillator 39 can be provided even when the ring oscillator of FIG. 7 is used as ring oscillator 39 of the internal voltage generation circuit (substrate voltage generation circuit, boosted voltage generation circuit) of the third embodiment. In the ring oscillator of FIG. 71 NMOS transistor 47 can be removed, and the source of NMOS transistor 45 can be connected to the node having ground voltage. In this case, a similar advantage can be obtained since the oscillation frequency of the ring oscillator has a negative dependence on power supply voltage Vcc.

Fourth Embodiment

Figure 8:
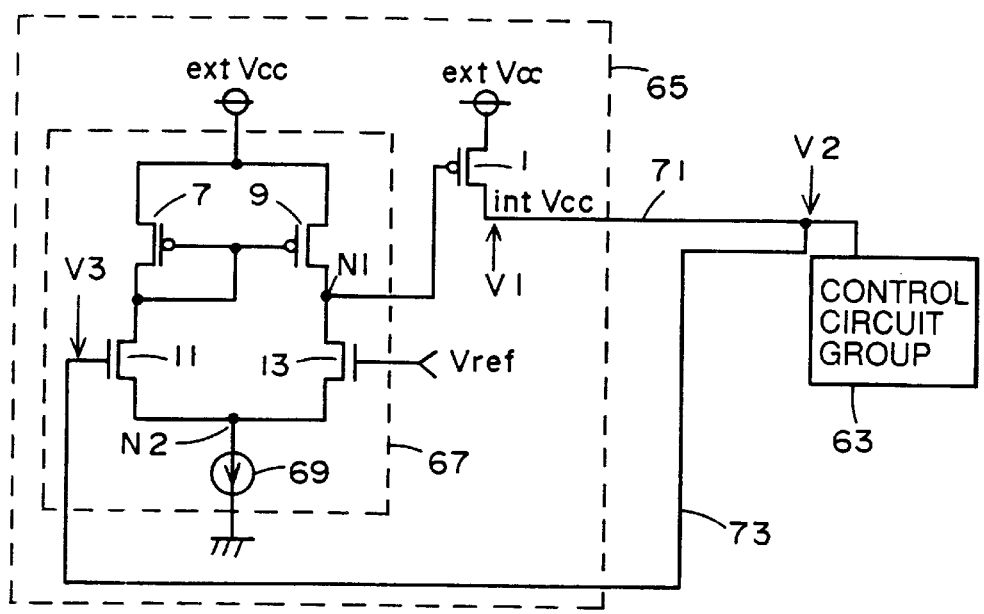
FIG. 8 is a circuit diagram showing a semiconductor device according to a fourth embodiment of the present invention, particularly an internal voltage-down power supply circuit thereof.

FIG. 8 shows a semiconductor device according to a fourth embodiment, particularly an internal voltage-down power supply circuit.

Referring to FIG. 8, the semiconductor device of the fourth embodiment includes an internal voltage-down power supply circuit 65 and a control circuit group (internal circuit) 63. Internal voltage-down power supply circuit 65 includes a voltage-down circuit 1 and a comparator circuit 67. Voltage-down circuit 1 is formed of a PMOS transistor, and is similar to voltage-down circuit 1 of FIG. 1. Comparator circuit 67 is formed of a current mirror type amplify circuit, and is similar to comparator circuit 3 of FIG. 1, provided that a constant current source 69 generating a constant current is disposed instead of current source 15 of comparator circuit 3 of FIG. 1. More specifically, comparator circuit 67 includes PMOS transistors 7 and 9, NMOS transistors 11 and 13, and a constant current source 69. Internal voltage-down power supply circuit 65 is arranged in the proximity of an external power supply pad not shown which is located at the chip end. Therefore, internal voltage-down power supply circuit 65 is arranged remote from control circuit group 63. Here, the external power supply pad not shown serves to supply external power supply voltage extVcc to internal voltage-down power supply circuit 65.

Internal voltage-down power supply circuit 65 is connected to control circuit group 63 by a power line 71. Internal power supply voltage intVcc generated in internal voltage-down power supply circuit 65 is supplied to control circuit group 63 via power line 71. Control circuit group 63 includes a plurality of control circuits, and operates with internal power supply voltage intVcc as the power supply voltage. The gate of NMOS transistor 11 of comparator circuit 67 is connected to power line 71 in the proximity of control circuit group 63 as shown by arrow V2 by a conductor line 73. Conductor line 73 is a sense line, for example. Power line 71 (arrow V1) in the proximity of voltage-down circuit 1 is not connected to the gate of NMOS transistor 11 as in the conventional case.

Here, as shown in FIG. 8, conductor line 73 is connected to power line 71 only in the proximity of control circuit group 63 (indicated by arrow V2). Therefore, conductor line 73 will not be connected to power line 71 at locations other than in the proximity of control circuit group 63. When conductor line 73 is connected to power line 71 in the proximity of control circuit group 63, conductor line 73 will not be connected to power line 71 at locations other than in the proximity of control circuit group 63.

The operation of comparator circuit 67 will be described briefly. Internal power supply voltage intVcc is applied to the gate of NMOS transistor 11 of comparator circuit 67. Reference voltage Vref is applied to the gate of NMOS transistor 13. When internal power supply voltage intVcc applied to NMOS transistor 11 becomes lower than reference voltage Vref, comparator circuit 67 provides a voltage of an L level from output node N1 to the gate of PMOS transistor 1. In response, PMOS transistor 1 is turned on to down-convert external power supply voltage extVcc and generate internal power supply voltage intVCC. In other words, internal power supply voltage intVcc is increased. When internal power supply voltage intVcc applied to the gate of NMOS transistor 11 increases to the level of reference voltage Vref, comparator circuit 67 provides a voltage of an H level from output node N1 to the gate of PMOS transistor 1. Therefore, PMOS transistor 1 is turned off. As a result, internal power supply voltage intVcc is stable at a level equal to reference voltage Vref. In contrast to the above-described general operation of an internal voltage-down power supply circuit, characteristic operations thereof will be described hereinafter.

Figure 9:
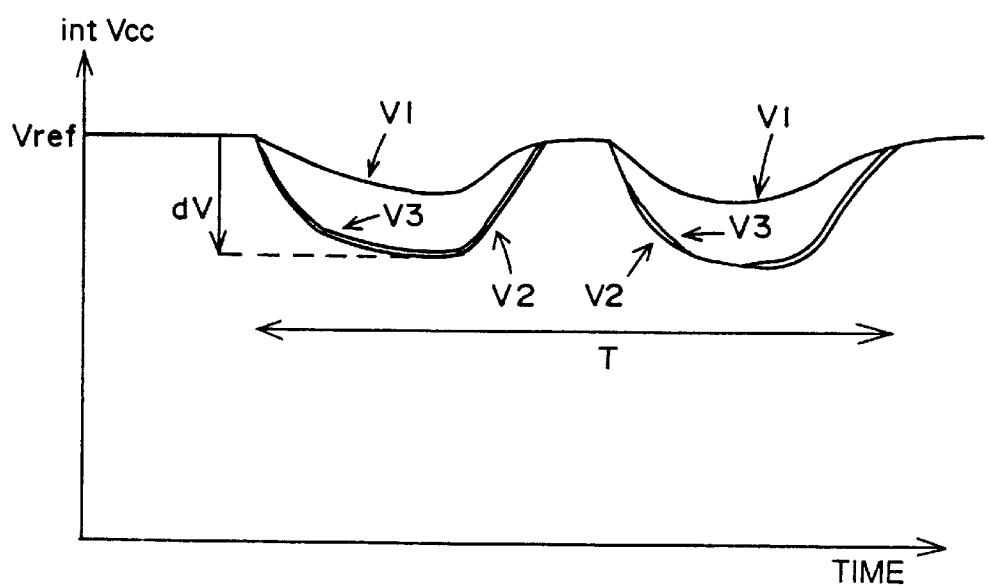
FIG. 9 is a diagram for describing an operation of the internal voltage-down power supply circuit of FIG. 8.

FIG. 9 is a diagram for describing the operation of internal voltage-down power supply circuit 65 of FIG. 8. Time is plotted along the abscissa, and internal power supply voltage intVcc is plotted along the ordinate. The curve labeled V1 in FIG. 9 corresponds to arrow V1 of FIG. 8, and indicates the variation of internal power supply voltage intVcc at power line 71 in the proximity of voltage-down circuit 1. The curve labeled V2 in FIG. 9 corresponds to arrow V2 of FIG. 8, and shows the variation of internal power supply voltage intVcc of power line 71 in the proximity of control circuit group 63. The curve labeled V3 in FIG. 9 corresponds to arrow V3 of FIG. 8, and indicates the variation of internal power supply voltage intVcc of conductor line 73 in the proximity of NMOS transistor 11.

The operation will be described with reference to FIGS. 8 and 9. Control circuit group 63 operates during an arbitrary period of a term T. Internal power supply voltage intVcc attains a level equal to reference voltage Vref prior to operation of control circuit group 63. This reference voltage Vref is referred to as "set voltage" hereinafter. In response to operation of control circuit group 63, internal power supply voltage intVcc in the proximity of voltage-down circuit 1 (arrow V1), in the proximity of control circuit group 63 (arrow V2), and in the proximity of NMOS transistor 11 (arrow V3) begins to drop. Here, the current flowing to power line 71 increases as power consumption of control circuit group 63 is increased. Therefore, the difference between the level of the internal power supply voltage in the proximity of voltage-down circuit 1 (arrow V1) and the level of the internal power supply voltage in the proximity of control circuit group 63 (arrow V2) becomes greater. No current flows through conductor line 73. Therefore, even when conductor line 73 is formed of a thin wiring with and the resistance is great, the level of internal power supply voltage in the proximity of control circuit group 63 (arrow V2) is substantially equal to the level of the internal power supply voltage in the proximity of NMOS transistor 11 (arrow V3). Therefore, variation in internal power supply voltage intVcc in the proximity of control circuit group 63 (arrow V2) is reflected by comparator circuit 67. More specifically, comparator circuit 67 operates according to variation in the internal power supply voltage (arrow V2) in the proximity of control circuit group 63. As a result, voltage-down circuit 1 generates internal power supply voltage intVcc according to variation of internal power supply voltage intVcc (arrow V2) in the proximity of control circuit group 63.

Figure 14:
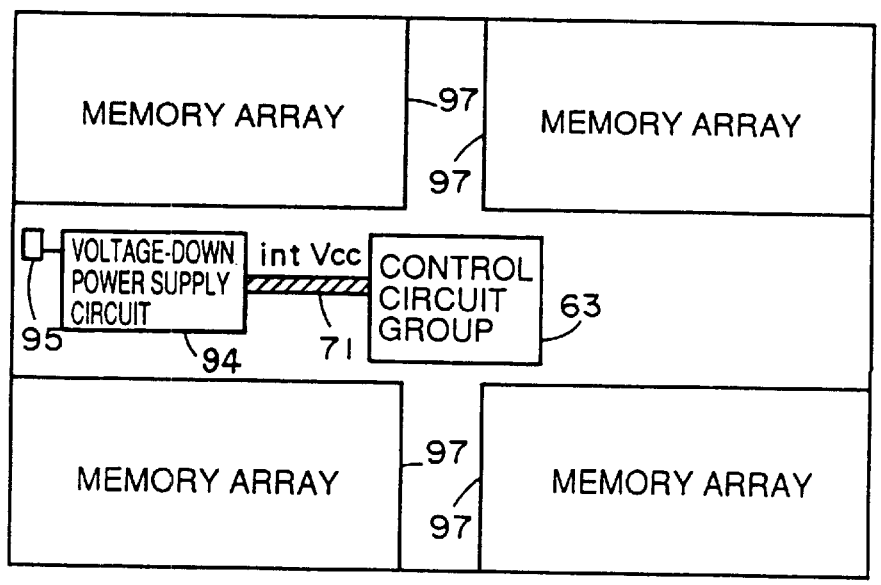
FIG. 14 is a schematic block diagram of a conventional semiconductor device.

Thus, according to the semiconductor device of the fourth embodiment, a voltage of a level substantially equal to the internal power supply voltage (arrow V2) in the proximity of control circuit group 63 is applied to the gate of NMOS transistor 11. Therefore, when control circuit group 63 operates and internal power supply voltage intVcc becomes lower, the output of comparator circuit 67 is greatly amplified towards the L level in comparison to the case of a conventional semiconductor device (FIG. 14) where internal power supply voltage intVcc in the proximity of voltage-down circuit 1 (arrow V1) is applied to the gate of NMOS transistor 11. Therefore, the channel resistance of PMOS transistor 1 becomes lower than in a conventional semiconductor device (FIG. 14) when internal power supply voltage intVcc is reduced. As a result, the drop dV of the internal power supply voltage in the proximity of control circuit group 63 (arrow V2) becomes smaller than that of a conventional semiconductor device (FIG. 14) when control circuit group 63 is operated. More specifically, since an internal voltage-down power circuit 65 that reflects variation of internal power supply voltage intVcc in the proximity of control circuit group 63 (arrow V2) is provided in the semiconductor of the fourth embodiment, variation of internal power supply voltage intVcc in the proximity of control circuit group 63 (arrow V2) can be reduced. This means that internal voltage-down power supply circuit 65 in the semiconductor device of the fourth embodiment has favorable followability with respect to variation in internal power supply voltage intVcc in the proximity of control circuit group 63 (arrow V2).

Fifth Embodiment

Figure 10:
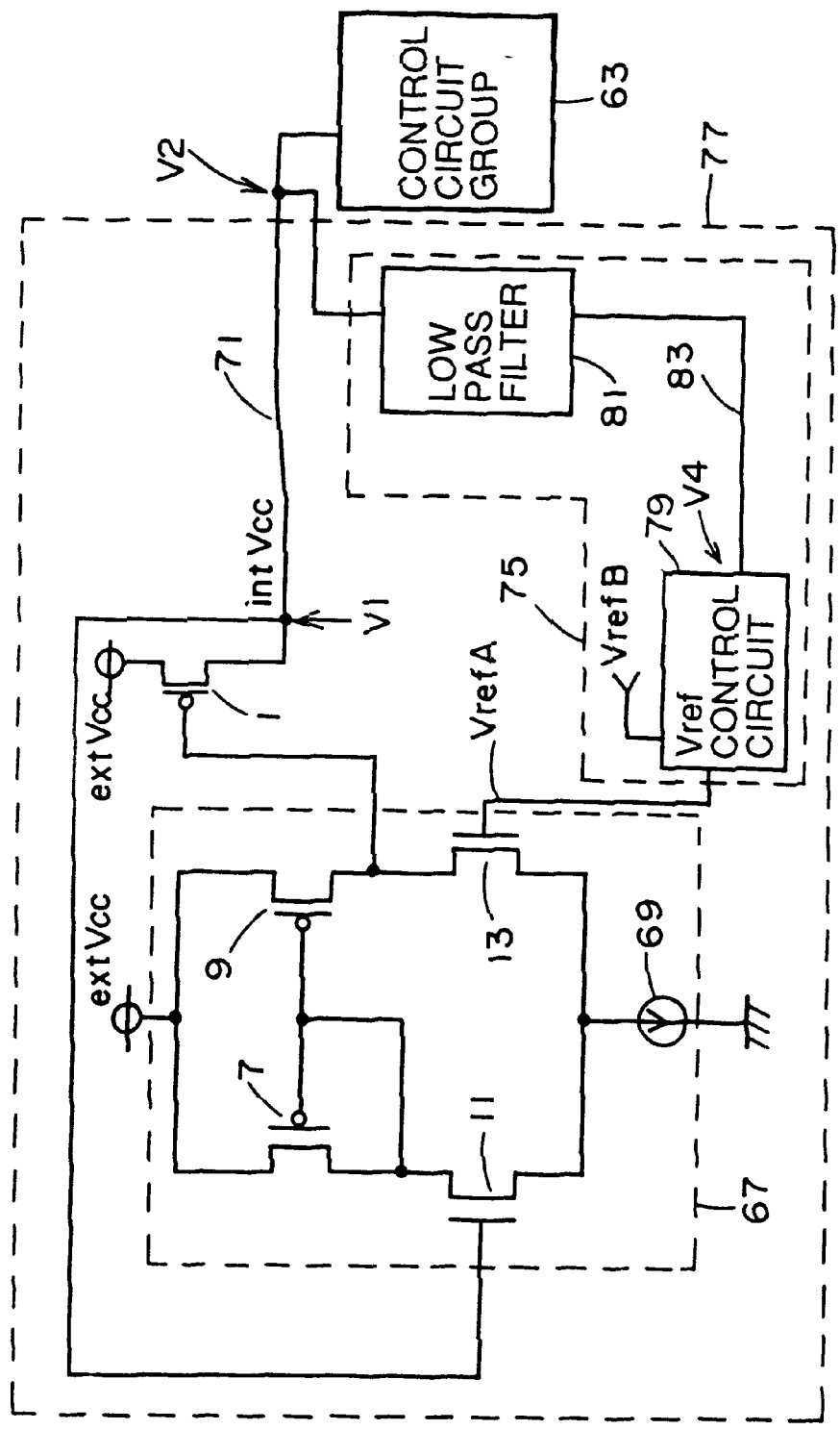
FIG. 10 is a circuit diagram of a semiconductor device according to a fifth embodiment of the present invention, particularly an internal voltage-down power supply circuit thereof.

FIG. 10 shows a semiconductor device according to a fifth embodiment of the present invention, particularly an internal voltage-down power supply circuit. Components corresponding to those of FIG. 8 have the same reference characters allotted, and their description will not be repeated.

Referring to FIG. 10, a semiconductor device according to a fifth embodiment of the present invention includes an internal voltage-down power supply circuit 77, and a control circuit group(internal circuit) 63. Internal voltage-down power supply circuit 77 includes a circuit-down circuit 1, a comparator circuit 67, and a reference voltage control circuit 75. Reference voltage control circuit 75 includes a low pass filter 81, and a Vref control circuit 79.

Excluding low pass filter 81, internal voltage-down power supply circuit 77 is arranged in the proximity of an external power supply pad not shown to supply external power supply voltage extVcc to internal voltage-down power supply circuit 77. Therefore, internal voltage-down power supply circuit 77 is remote from control circuit group 63, except for low pass filter 81. The external power supply pad not shown is arranged at the chip end.

Internal power supply voltage intVcc of power line 71 in the proximity of voltage-down circuit 1, as shown by arrow V1 is applied to the gate of NMOS transistor 11 of comparator circuit 61. Reference voltage VrefA from Vref control circuit 75 is applied to the gate of NMOS transistor 13 of comparator circuit 67. Internal power supply voltage intVcc of power supply line 71 in the proximity of control circuit group 63, as shown by (arrow V2) is applied to Vref control circuit 79 via low pass filter 81 and conductor line 83. Vref control circuit 79 also receives a reference voltage VrefB. Reference voltage VrefA having a level according to variation in internal power supply voltage intVcc in the proximity of control circuit group 63 (arrow V2) is applied to the gate of NMOS transistor 13 by Vref control circuit 79, which will be described in detail afterwards. Low pass filter 81 serves to apply low frequency components of internal power supply voltage intVcc to Vref control circuit 79.

Figure 11:
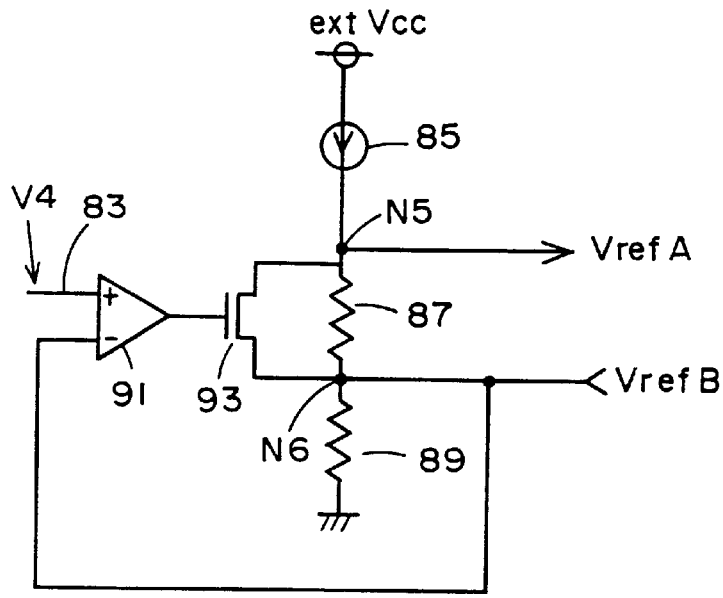
FIG. 11 is a circuit diagram showing in detail a Vref control circuit of FIG. 10.

FIG. 11 is a circuit diagram showing in detail Vref control circuit 79 of FIG. 10. Components in FIG. 11 corresponding to those of FIG. 10 have the same reference characters allotted, and their description will not be repeated.

Referring to FIG. 11, Vref control circuit 79 includes a comparator circuit 91, an NMOS transistor 93, a constant current source 85, and resistance elements 87 and 89.

Constant current source 85 is connected between the node having external power supply voltage extVcc and a node N5. NMOS transistor 93 and resistance element 87 is connected in parallel between node N5 and node N6. NMOS transistor 93 has its gate connected to the output node of comparator circuit 91. Resistance element 89 is connected between node N6 and the node having the ground voltage. Comparator circuit 91 has one input node connected to conductor line 83. More specifically, internal power supply voltage intVcc in the proximity of control circuit group 63 (arrow V2) is applied to one input node of comparator circuit 91 via low pass filter 81. Comparator circuit 91 has the other input node connected to node N6. Reference voltage VrefB is applied to node N6. In other words, reference voltage VrefB is applied to the other input node of comparator circuit 91. Node N5 is the output node of Vref control circuit 79. Reference voltage VrefA is applied from this output node to the gate of NMOS transistor 13 (FIG. 10).

Figure 12:
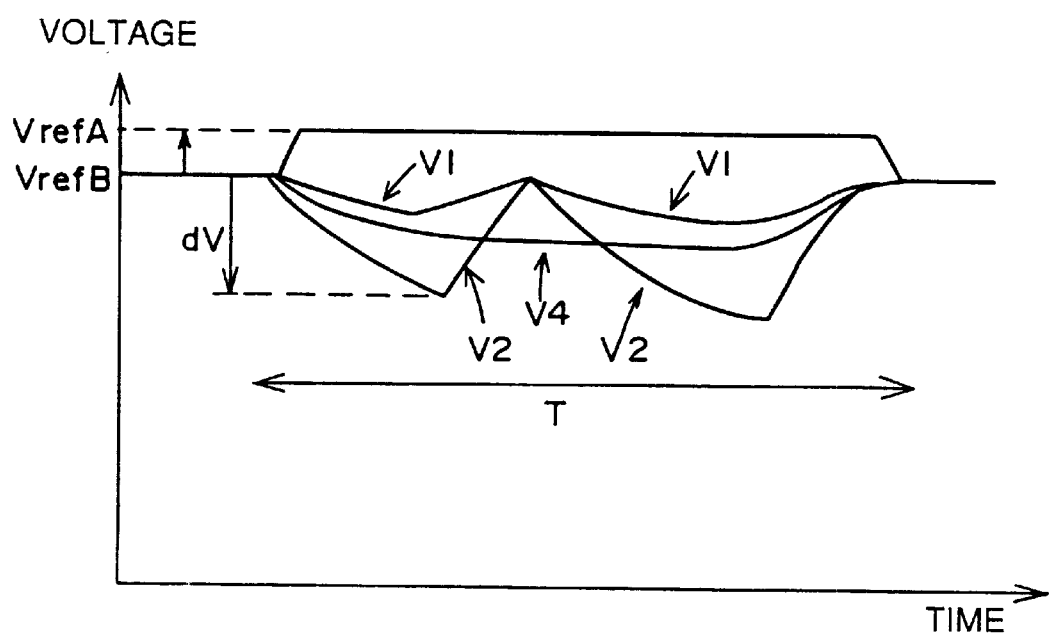
FIG. 12 is a diagram for describing an operation of the internal voltage-down power supply circuit of FIG. 10.
Figure 13:
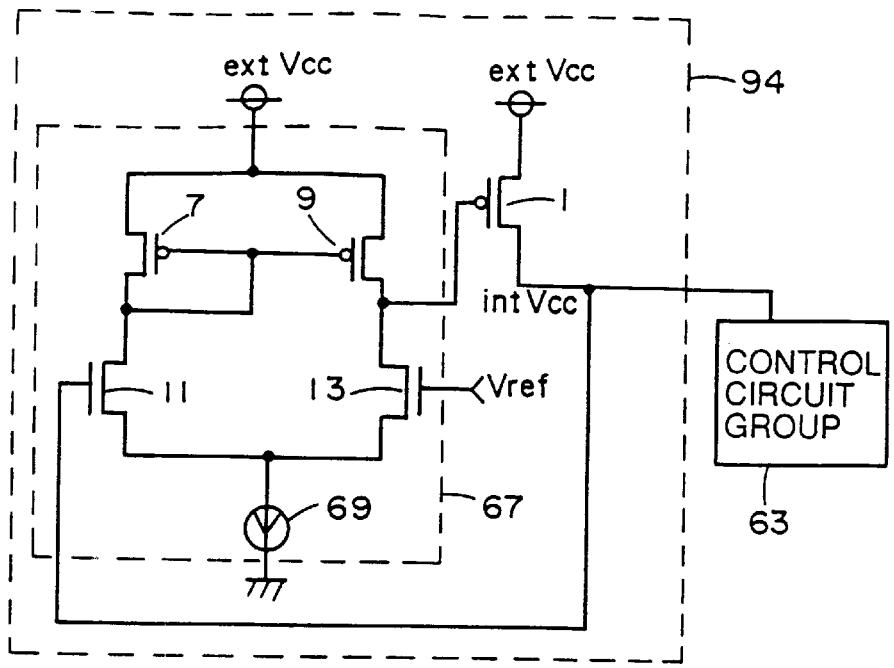
FIG. 13 is a circuit diagram showing in detail a conventional internal voltage-down power supply circuit.

FIG. 12 is a graph for describing the operation of internal voltage-down power supply circuit 77 of FIG. 10. Time is plotted along the abscissa, and the voltage is plotted along the ordinate. This curve labeled V1 in FIG. 12 corresponds to arrow V1 of FIG. 10, and indicates the variation of internal power supply voltage intVcc in the proximity of voltage-down circuit 1. The curve labeled V2 of FIG. 12 corresponds to arrow V2 of FIG. 10, and indicates the variation of internal power supply voltage intVcc in the proximity of control circuit group 63. The curve labeled V4 of FIG. 12 indicates the variation of internal power supply voltage intVcc in the proximity (arrow V2) of control circuit group 63 (FIG. 10) that is applied to Vref control circuit 79 (FIG. 10) via low pass filter 11 (FIG. 10).

The operation of internal voltage-down power supply circuit 77 of FIG. 10 will be described with reference to FIGS. 10–12. Control circuit group 63 operates during an arbitrary time period of term T. When control circuit group 63 does not operate, the voltage (arrow V4) applied to one input node of comparator circuit 91 (FIG. 11) via conductor line 83 attains a level equal to that of reference voltage VrefB. Here, when the voltage applied to the one input node of comparator circuit 91 via conductor line 83 is equal to reference voltage VrefB applied to the other input node of comparator circuit 91, an offset is provided in comparator circuit 91 so that the output voltage of comparator circuit 91 attains an H level. In response to a voltage of an H level applied to the gate, NMOS transistor 93 is turned on. Therefore, the voltage of node N5 becomes equal to that of node N6. More specifically, reference voltage VrefA provided from node N5 becomes equal to that of reference voltage VrefB. More specifically, when control circuit group 63 is not operating, reference voltage VrefA applied to the gate of NMOS transistor 13 (FIG. 10) is equal to reference voltage VrefB. Therefore, internal power supply voltage intVcc is equal to reference voltage VrefB when control circuit group 63 does not operate.

When control circuit group 63 operates during term T, internal power supply voltage intVcc in the proximity (arrow V2) of control circuit group 63 begins to fall from the level of reference voltage VrefB due to the current flowing to control circuit group 63. The low frequency components of internal power supply voltage intVcc in the proximity (arrow V2) of control circuit group 63 are applied to Vref control circuit 79 (comparator circuit) 91. When control circuit group 63 operates and the internal power supply voltage is decreased, and when the low frequency components of internal power supply voltage intVcc in the proximity of control circuit group 63 (arrow V2) are applied to one input node of comparator circuit 91 via a low pass filter 81, comparator circuit 91 provides a voltage of an L level. NMOS transistor 93 (FIG. 11) receiving a voltage of an L level at its gate is turned off. Therefore, the voltage of node N5 becomes higher than the voltage of node N6. More specifically, the voltage of node N5 becomes higher than the voltage of node N6 by Im Rt where Im is the constant current generated from constant current source 85, and Rt is the resistance value of resistance element 87. This means that reference voltage VrefA becomes higher than reference voltage VrefB by Im Rt.

When control circuit group 63 operates and internal power supply voltage intVcc in the proximity thereof (arrow V2) decreases, reference voltage VrefA becomes higher than reference voltage VrefB, and the increased reference voltage VrefA is applied to the gate of NMOS transistor 13 (FIG. 10). As a result, the output of comparator circuit 67 (FIG. 10) is greatly amplified towards the L level, whereby the channel resistance of PMOS transistor 1 (FIG. 10) becomes smaller than the case where reference voltage fixed to the gate of NMOS transistor 13 is applied. Thus, the drop dV of internal power supply voltage intVcc during operation of control circuit group 63 is smaller than the case where a reference voltage fixed to the gate of NMOS transistor 13 is applied.

When the operation of control circuit group 63 ends, reference voltage VrefA becomes equal to reference voltage VrefB. Therefore, the level of internal power supply voltage intVcc becomes equal to the level of reference voltage Vref.

In the semiconductor device of the fifth embodiment, the level of reference voltage VrefA applied to the gate of NMOS transistor 13 of comparator circuit 67 is varied according to a change in internal power supply voltage intVcc (arrow V2) in the proximity of control circuit group 63. More specifically, internal power supply voltage intVcc can be generated according to variation in internal power supply voltage intVcc in the proximity (arrow V2) of control circuit group 63. This means that the followability with respect to change in internal power supply voltage intVcc in the proximity (arrow V2) of control circuit group 63 is superior.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An internal voltage generation circuit for generating an internal voltage, comprising:
    oscillation means for oscillating a pulse voltage according to a power supply voltage,
    pump means for generating said internal voltage according to said pulse voltage, and
    oscillation control means, including a current mirror type amplifier, for controlling said oscillation means so that, when said power supply voltage is reduced, a frequency of said pulse voltage becomes higher according to said reduction of said power supply voltage, and when said power supply voltage is increased, the frequency of said pulse voltage becomes lower according to said increase.

2. The internal voltage generation circuit according to claim 1, wherein said oscillation control means generates a control voltage that is, when said power supply voltage is increased, reduced according to said increase, and when said power supply voltage is reduced, increased according to said reduction,
    wherein said oscillation means comprises
        a plurality of inverters, and
        current control means for controlling current flowing through said plurality of inverters,
        wherein said current control means conducts said current of a magnitude according to a level of said control voltage to said plurality of inverters.

3. The internal-voltage generation circuit according to claim 2, wherein said oscillation control means comprises
    a constant current source for generating a constant current, and resistance means connected to said constant current source, wherein said resistance means includes a resistance element having a resistance value that is, when said power supply voltage is increased, reduced according to said increase, and when said power supply voltage is reduced, increased according to said reduction, wherein said control voltage is provided from a node of said constant current source and said resistance means.

4. An internal voltage generation circuit for generating an internal voltage, comprising:

oscillation means for oscillating a pulse voltage according to a power supply voltage, pump means for generating said internal voltage according to said pulse voltage, and oscillation control means for controlling said oscillation means so that, when said power supply voltage is reduced, a frequency of said pulse voltage becomes higher according to said reduction of said power supply voltage, and when said power supply voltage is increased, the frequency of said pulse voltage becomes lower according to said increase, wherein said oscillation control means generates a control voltage that is, when said power supply voltage is increased, reduced according to said increase, and when said power supply voltage is reduced, increased according to the reduction, wherein said oscillation means comprises
a plurality of inverters, and
current control means for controlling current flowing through said plurality of inverters,
wherein said current control means conducts said current of a magnitude according to a level of said control voltage to said plurality of inverters, and wherein said oscillation control means comprises
a first resistance element connected between a node having said power supply voltage and a first node,
a first transistor connected between said first node and a node having ground voltage,
a constant current source connected between said node having said power supply voltage and a second node,
a second transistor connected between said second node and said node having said ground voltage, and a second resistance element connected between said second node and said node having said ground voltage, wherein control electrodes of said first and second transistors are connected to said first node, and wherein said control voltage is provided from said second node.

5. An internal voltage generation circuit for generating an internal voltage, comprising:

oscillation means for oscillating a pulse voltage according to a power supply voltage, said oscillation means comprising
a plurality of inverters each comprising a pair of transistors,
current control means for controlling current flowing to said plurality of inverters, said control means being connected to a source region of only one of the transistors of each said inverter, pump means for generating said internal voltage according to said pulse voltage, and oscillation control means for controlling said oscillation means so that, when said power supply voltage is reduced, a frequency of said pulse voltage becomes higher according to said reduction of said power supply voltage, and when said power supply voltage is increased, the frequency of said pulse voltage becomes lower according to said increase.

6. An internal voltage generation circuit for generating an internal voltage, comprising:

oscillation means for oscillating a pulse voltage according to a power supply voltage, pump means for generating said internal voltage according to said pulse voltage, and oscillation control means for controlling said oscillation means based on at least two kinds of control voltages so that, when said power supply voltage is reduced, a frequency of said pulse voltage becomes higher according to said reduction of said power supply voltage, and when said power supply voltage is increased, the frequency of said pulse voltage becomes lower according to said increase.

* * * * *